(12) United States Patent
Liang et al.

(10) Patent No.: US 7,721,970 B2
(45) Date of Patent: May 25, 2010

(54) MOUNTING APPARATUS FOR CARD READER

(75) Inventors: Chun-Chi Liang, Tu-Cheng (TW); Hsuan-Tsung Chen, Tu-Cheng (TW); Yu Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 903 days.

(21) Appl. No.: 11/309,044

(22) Filed: Jun. 13, 2006

(65) Prior Publication Data

US 2007/0125854 A1    Jun. 7, 2007

(30) Foreign Application Priority Data

Jul. 8, 2005    (CN) .................. 2005 2 0061390

(51) Int. Cl.
*G06K 13/04* (2006.01)
(52) U.S. Cl. ..................................... 235/479; 235/483
(58) Field of Classification Search ................ 235/479, 235/483, 486
See application file for complete search history.

(56) References Cited

U.S. PATENT DOCUMENTS 5,554,840 A * 9/1996 Saroya ...................... 235/441
5,892,210 A * 4/1999 Levasseur ................... 235/380
6,042,010 A * 3/2000 Kanayama et al. .......... 235/449
6,116,933 A * 9/2000 Willhite ...................... 439/260
6,688,521 B2   2/2004 Cheng
7,048,187 B1 * 5/2006 Yu ............................. 235/451

FOREIGN PATENT DOCUMENTS

CN    02226748.4    2/2003

* cited by examiner

*Primary Examiner*—Ahshik Kim
(74) *Attorney, Agent, or Firm*—Wei Te Chung

(57) ABSTRACT

A mounting apparatus for mounting a card reader that defines a fixing hole in a sidewall thereof, and forms a first connector in a rear wall thereof, includes a chassis, a bracket slidably mounted to the chassis, a pair of first resilient members, and a locking member. The chassis includes a front wall defining a first opening for the card reader passing therethrough. A second connector is mounted to the bracket, corresponding to the first connector of the card reader. The first resilient members are connected between the chassis and the bracket. The first resilient members are stretched when mounting the card reader. The locking member includes a retaining member mounted to the chassis, and a securing member mounted to the retaining member via a second resilient member. The securing member includes a securing portion protruding therefrom for engaging with the fixing hole of the card reader.

18 Claims, 8 Drawing Sheets

MOUNTING APPARATUS FOR CARD READER

FIELD OF THE INVENTION

The present invention relates to mounting apparatuses, and particularly to a mounting apparatus readily allowing installation or removal of a card reader thereto or therefrom.

DESCRIPTION OF RELATED ART

Traditionally, card readers are connected with a host machine from the outside via an inseparable cable line which transmits data. One end of the cable line is connected with the card reader, and the other end is connected with a plug for use in a Universal Serial Bus (USB). When the card reader is needed, the user has to plug the USB plug into the USB connection port of a desktop computer or notebook. By this method, not only is the action of connecting the lines needed, but also space that might be put to better use around the computer is used.

At present, the capacity of memory cards regularly increases, while at the same time, prices regularly decrease. Therefore, host machines with built-in card readers have become available in the market. However, built-in card readers are not portable. If a user works with more than one computer at more than one location then each computer would require a card reader, which would be expensive.

Some conventional host machines have separable card readers installed therein. However, the mechanism of the host machines to remove the installed card readers is usually complicated and difficult to manipulate. Especially, the mechanism is more likely to become unbalanced during removing of the card readers, hence the card readers are somehow difficult to be smoothly removed.

What is desired, therefore, is a mounting apparatus which readily allows convenient installation or removal of a card reader thereto or therefrom for portability.

SUMMARY OF THE INVENTION

An exemplary mounting apparatus for mounting a card reader that defines a fixing hole in a sidewall thereof, and forms a first connector in a rear wall thereof, includes a chassis, a bracket slidably mounted to the chassis, a pair of first resilient members, and a locking member. The chassis includes a front wall defining a first opening for the card reader passing therethrough. A second connector is mounted to the bracket, corresponding to the first connector of the card reader. The first resilient members are connected between the chassis and the bracket. The first resilient members are stretched when mounting the card reader. The locking member includes a retaining member mounted to the chassis, and a securing member mounted to the retaining member via a second resilient member. The securing member includes a securing portion protruding therefrom for engaging with the fixing hole of the card reader.

Other advantages and novel features will become more apparent from the following detailed description when taken in conjunction with the accompanying drawings, in which:

DETAILED DESCRIPTION OF THE INVENTION

Figure 1:
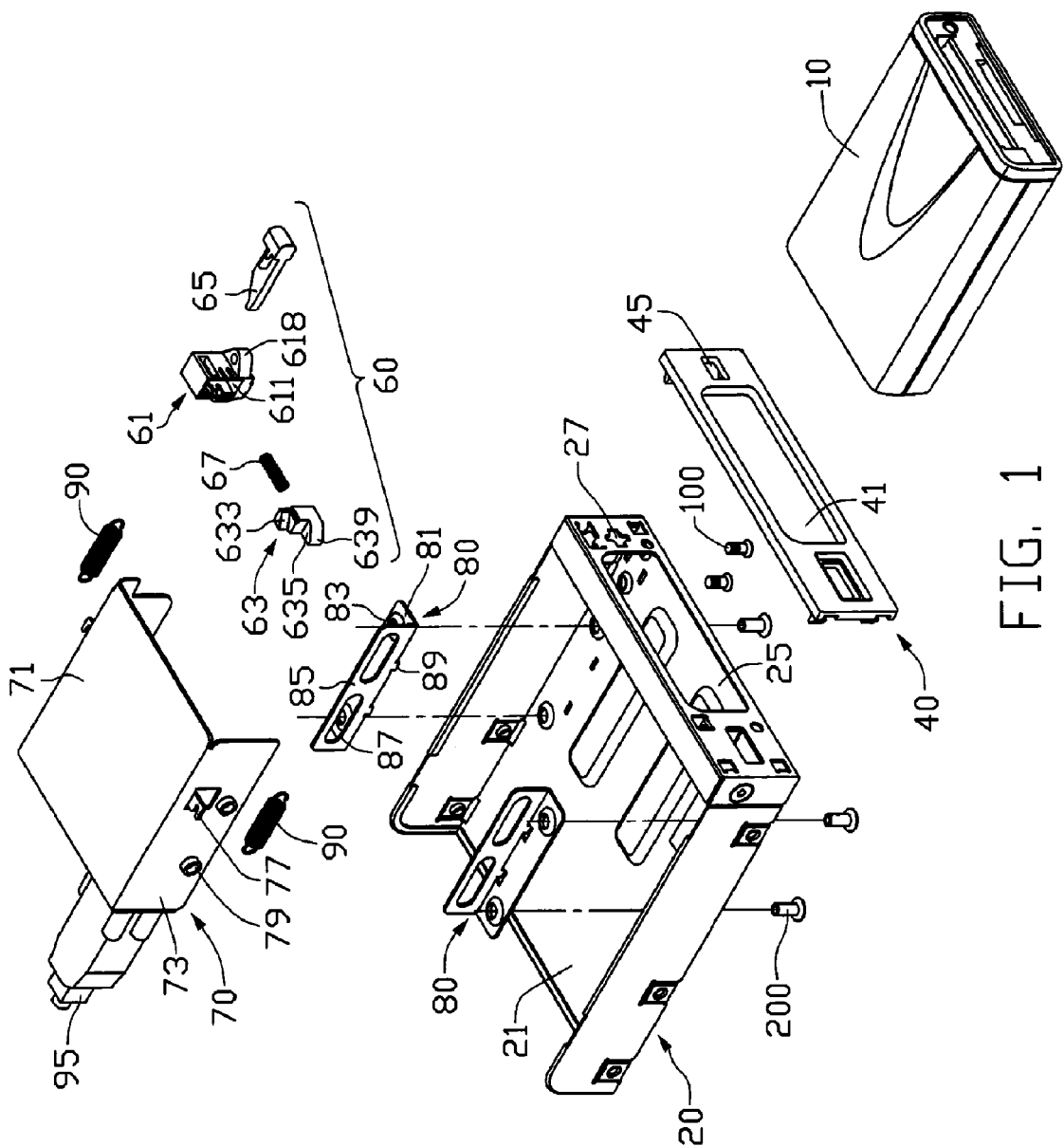
FIG. 1 is an exploded, isometric view of a mounting apparatus for a card reader in accordance with a preferred embodiment of the present invention, together with a card reader, the mounting apparatus includes a chassis, a bracket, and a locking member.
Figure 2:
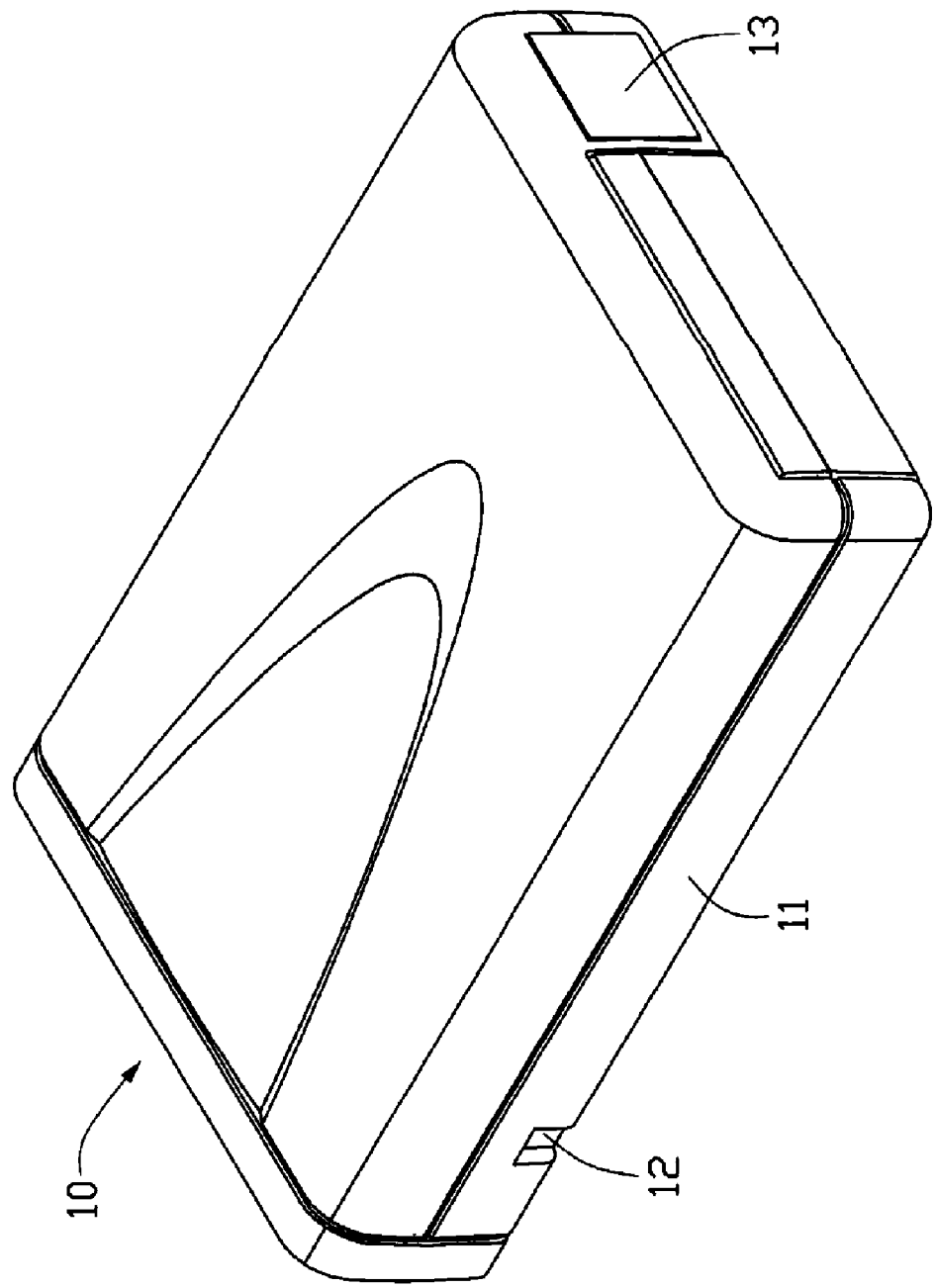
FIG. 2 is an isometric view of the card reader of FIG. 1, but viewed from another aspect.

Referring to FIGS. 1 and 2, a mounting apparatus of an electronic device like a host computer in accordance with a preferred embodiment of the present invention is shown for mounting a portable component of the host computer like a card reader 10 thereto. The card reader 10 defines a fixing hole 12 in a sidewall 11 thereof, and a female connector 13 in a rear wall thereof. The mounting apparatus includes a chassis 20, a bezel 40, a bracket 70, a locking member 60, a pair of mounting members 80, and a pair of first resilient members 90.

Figure 3:
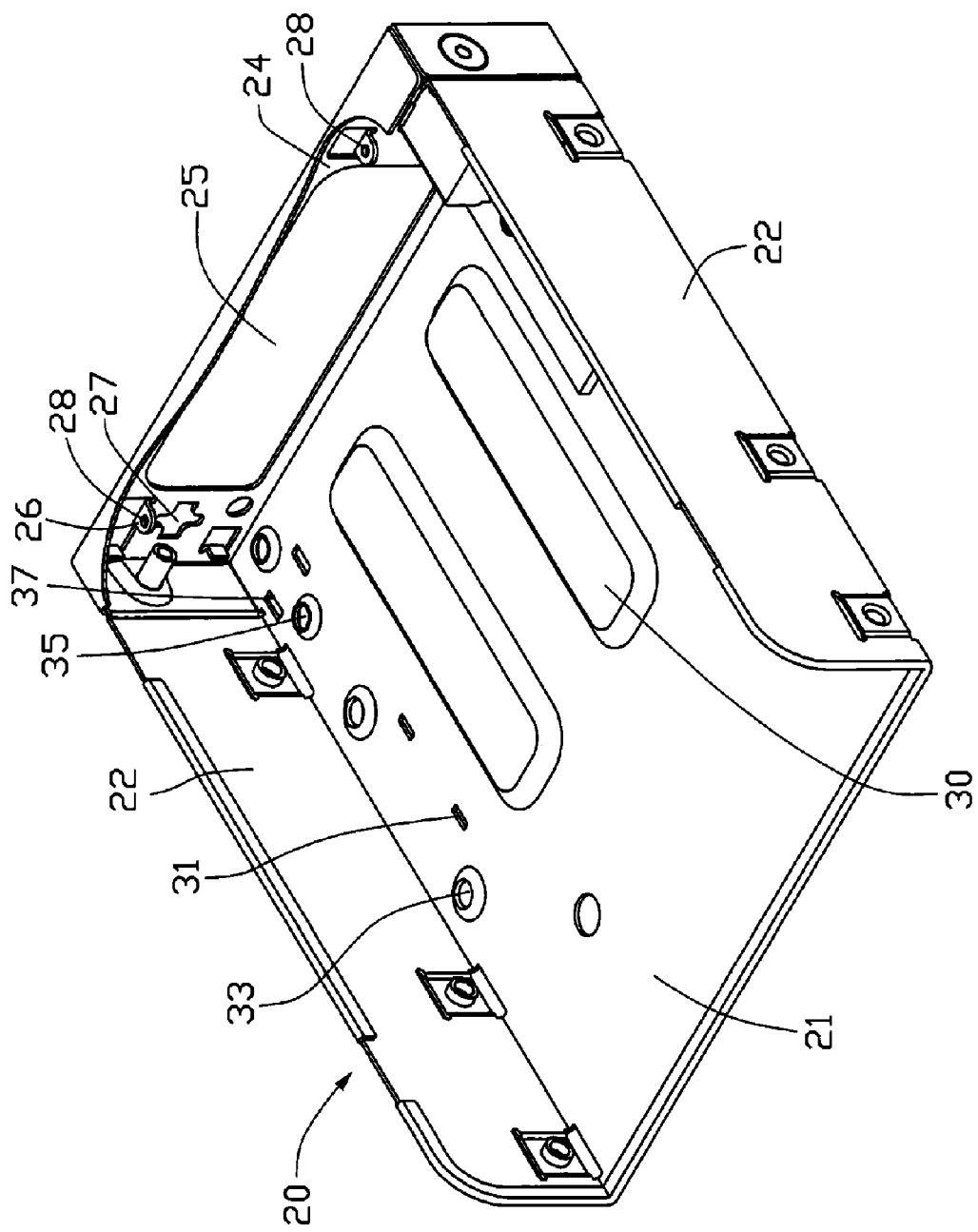
FIG. 3 is an isometric view of the chassis of FIG. 1, but viewed from another aspect.

Referring also to FIG. 3, the chassis 20 includes a bottom wall 21, a front wall 24 extending up from a front side of the bottom wall 21, and a pair of sidewalls 22 extending up from opposite sides of the bottom wall 21. Two pairs of first locking holes 33 are defined consecutively in the bottom wall 21 adjacent the corresponding sidewalls 22. In the bottom wall 21 between the locking holes of each pair of locking holes 33, a pair of first locating holes 31 is defined. A pair of second locking holes 35 is defined in the bottom wall 21 adjacent the front wall 24 and one sidewall 22. A pair of second locating holes 37 is defined in the bottom wall 21 between the locking holes of the pair of second locking holes 35. A pair of protrusions 30 parallel to the sidewalls 22 is stamped upwardly from the bottom wall 21. A first opening 25 is defined in the front wall 24 for the card reader 10 passing therethrough. Two hooking tabs 26 are stamped rearward from the front wall 24 and situated at opposite sides of the first opening 25 respectively. A hooking hole 28 is defined in each hooking tab 26. A cross-shaped through hole 27 is defined in the front wall 24 under one of the hooking tabs 26 adjacent the second locking holes 35.

The bracket 70 includes a top board 71 parallel to the bottom wall 21 of the chassis 20, and a pair of sideboards 73 extending down from opposite sides of the top board 71. A pair of posts 79 extends out from each sideboard 73. A clasp 77 above one of each of the pair of posts 79 is stamped outwardly from each sideboard 73. A male connector 95 is mounted to a rear side of the bracket 70.

Each mounting member 80 includes a mounting portion 81, and a supporting portion 85 extending up from a side of the mounting portion 81. A pair of third locking holes 83 is defined in the mounting portion 81. A pair of sliding slots 87 is defined in the supporting portion 85 for holding the corresponding posts 79 of the bracket 70 to slide therein. A pair of first locating tabs 89 is stamped downwardly from a side of the mounting portion 81 adjacent the supporting portion 85.

Figure 4:
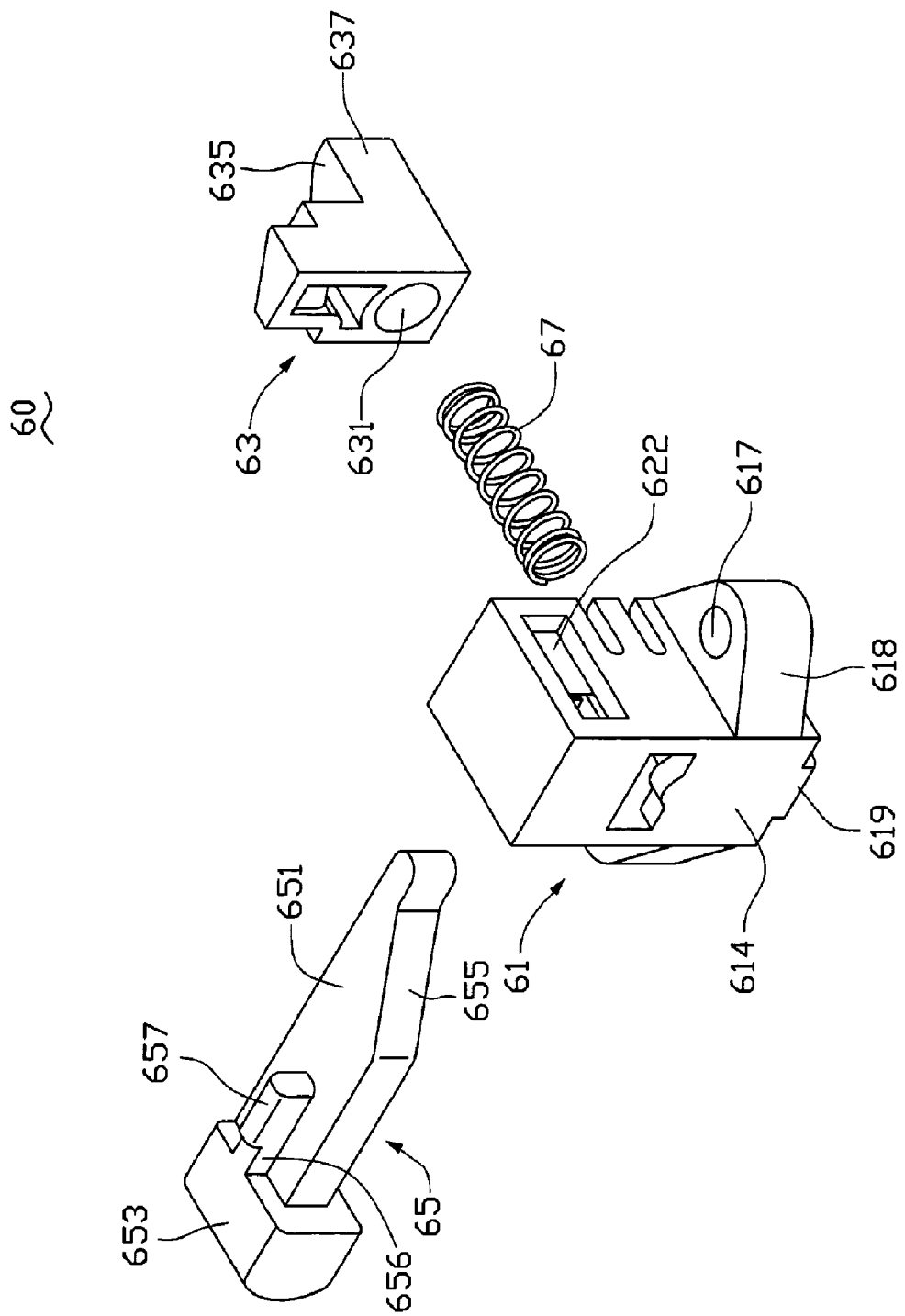
FIG. 4 is an exploded, isometric view of the locking member of FIG. 1, the locking member includes a retaining member, an operating member, and a securing member.
Figure 5:
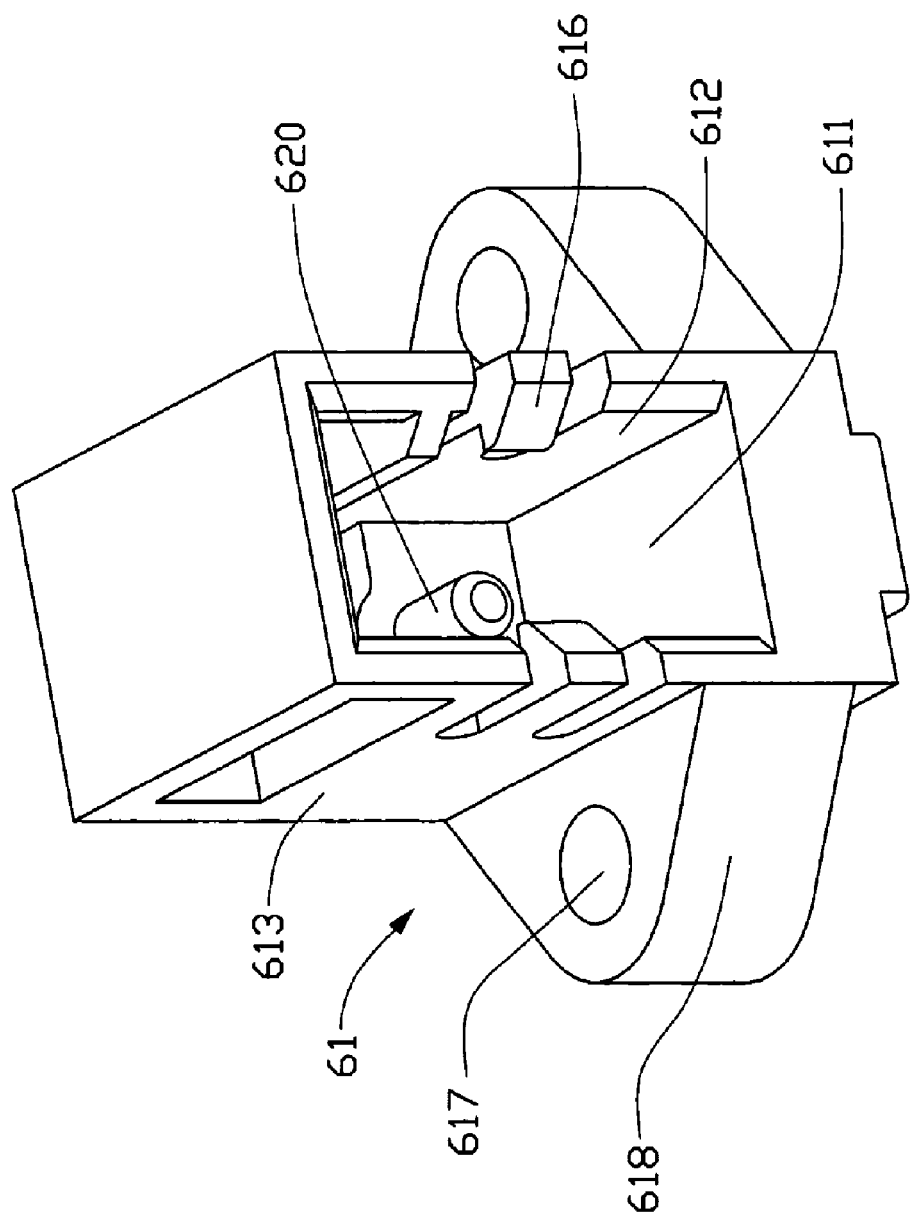
FIG. 5 is an isometric view of the retaining member of FIG. 4, but viewed from another aspect.

Referring also to FIGS. 4 and 5, the locking member 60 includes a retaining member 61, an operating member 65, a securing member 63, and a second resilient member 67. The retaining member 61 includes a bottom portion 611, a front portion 612 extending up from a front side of the bottom portion 611, a rear portion 613 extending up from a rear side of the bottom portion 611, and a side portion 614 extending up from a side of the bottom portion 611. The bottom portion 611, rear portion 613, and side portion 614 enclose a retaining space for holding the second resilient member 67 of the securing member 63. An L-shaped resilient hook 616 is stamped in each of the front portion 612 and the rear portion 613. A mounting portion 618 extends from a lower portion of each of the front portion 612 and the rear portion 613. A securing hole 617 is defined in each mounting portion 618. A second locating tab 619 extends down from each of two opposite sides of the bottom portion 611. A shaft 620 extends into the retaining space from the side portion 614. A containing hole 622 is defined in each of the front portion 612 and the rear portion 613 opposite to each other for the operating member 65 sliding therein.

The operating member 65 includes a button 653, and a pusher 651 extending back from the button 653. A slanting first guiding surface 655 is formed at a rear end of the pusher 651. A rib 656 extends from each of a top and a bottom of the pusher 651 adjacent the button 653. Extending from the back of each rib is a blocking portion 657.

The securing member 63 includes a slanting second guiding surface 633 at a an upper portion thereof, corresponding to the first guiding surface 655 of the operating member 65, and a securing portion 635 extending from a lower portion thereof. A stopping portion 637 is formed at a rear side of the securing portion 635. An arch-shaped third guiding surface 639 is formed at a front side of the securing portion 635. A retaining hole 631 is defined in a side of the securing member 63 facing the retaining member 61.

The bezel 40 defines a second opening 41 therein, corresponding to the first opening 25 of the chassis 20. An aperture 45 is defined in the bezel 40, corresponding to the through hole 27 of the chassis 20.

Figure 6:
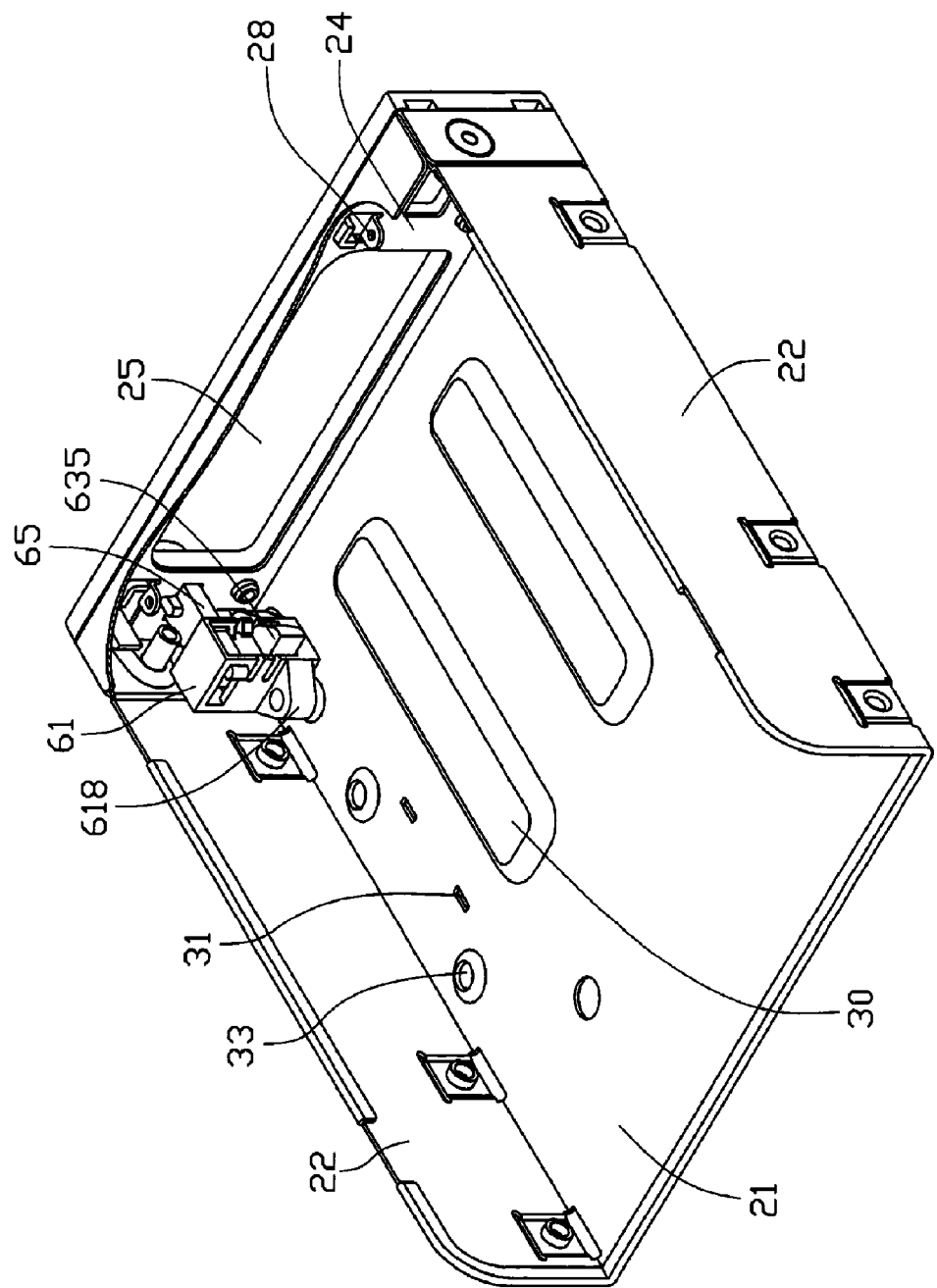
FIG. 6 is an assembled view of the chassis and the locking member of FIG. 1, but viewed from another aspect.
Figure 7:
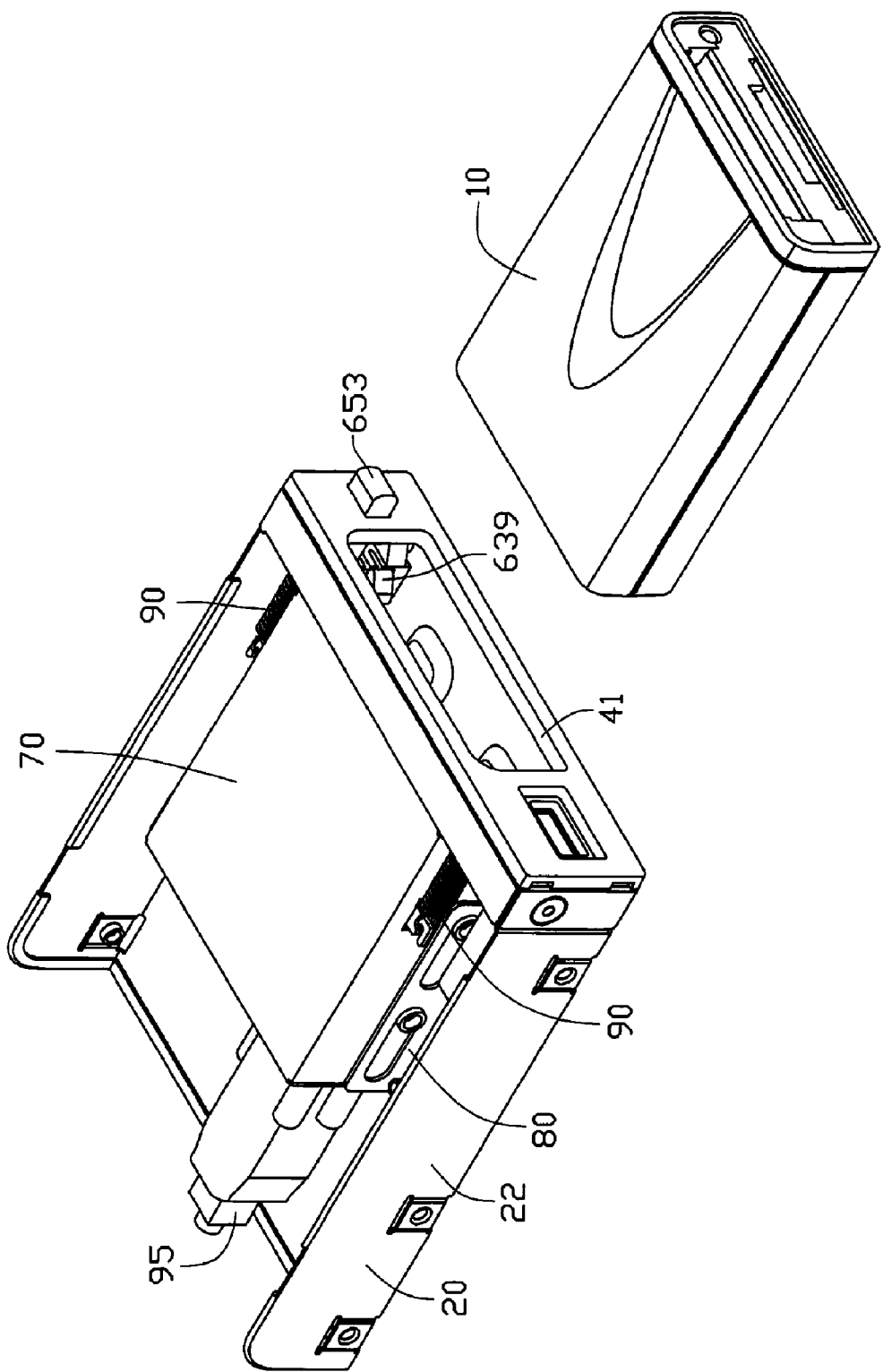
FIG. 7 is an assembled view of the mounting apparatus of FIG. 1.
Figure 8:
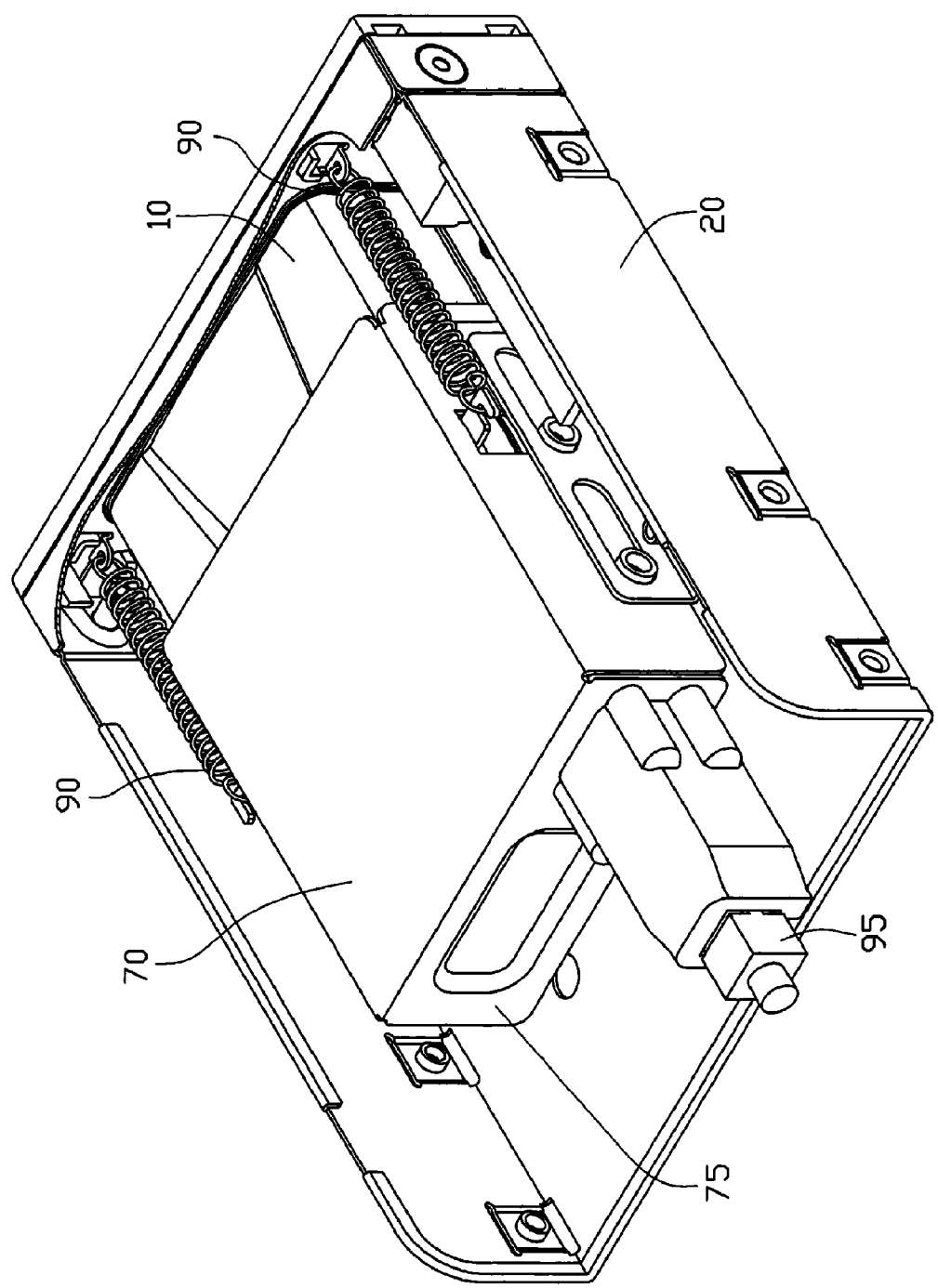
FIG. 8 is an assembled view of FIG. 1, but viewed from another aspect.

Referring also to FIGS. 6 to 8, in assembly, one end of the second resilient member 67 is received in the retaining hole 631 of the securing member 63. And the other end of the second resilient member 67 fits about the shaft 620 of the retaining member 61. The securing member 63 is pressed into the retaining space of the retaining member 61. The hooks 616 prevent the securing member 63 from being disengaged from the retaining member 61. The second locating tabs 619 of the retaining member 61 are received in the second location holes 37 of the chassis 20, with the securing holes 617 of the retaining member 61 aligning with the corresponding second locking holes 35 of the chassis 20. Screws 200 are inserted through the second locking holes 35 to be engaged in the securing holes 617 to secure the locking member 60 to the bottom wall 21 of the chassis 20.

The posts 79 of the bracket 70 are received in the corresponding sliding slots 87 of the mounting members 80. The second locating tabs 89 of the mounting members 80 are received in the corresponding first locating holes 31 of the bracket 20, with the third locking holes 83 of the mounting members 80 aligning with the corresponding first locking holes 33 of the bracket. Rivets 300 are inserted through the first locking holes 33 of the chassis 20 to be engaged in the third locking holes 83 of the mounting members 80. One end of each first resilient member 90 hooks a corresponding clasp 77 of the bracket 70. And the other end of the first resilient members 90 is engaged in the hooking hole 28 of a corresponding hooking tab 26 of the chassis 20. Thus, the bracket 70 is slidably mounted to the chassis. The pusher 651 of the operating member 65 is inserted through the through hole 27 of the chassis 20 and the containing holes 622 of the retaining member 61. The first guiding surface 633 of the securing member 63 is located between the second guiding surface 655 of the operating member 65 and the side portion 614 of the retaining member 61. The second resilient member 67 elastically presses the first guiding surface 633 of the securing member 63 against the second guiding surface 655 of the operating member 65. The bezel 40 is mounted to an outer surface of the front wall 24 of the chassis 20. The button 653 of the operating member 65 is received in the aperture 45 of the bezel 40. The blocking portions 657 of the operating member 65 are blocked by the bezel 40 at upper and lower sides of the aperture 45.

In assembling the card reader 10, the card reader 10 is inserted through the second opening 41 of the bezel 40 and the first opening 25 of the chassis 20. The card reader 10 slides on the protrusions 30 of the chassis 20. The sidewall 11 of the card reader 10 slides on the third guiding surface 639 of the securing member 63 to drive the securing member 63 to retract into the retaining member 61. The securing portion 635 of the securing member 63 is resiliently depressed by the sidewall 11 of the card reader 10. Thus, the card reader 10 is inserted into the bracket 70. The female connector 13 of the card reader 10 touches the male connector 95 that is mounted to the bracket 70, and the card reader 10 pushes the bracket to slide. The posts 79 of the bracket 70 slide in the corresponding sliding slots 87 of the mounting members 80. The first resilient members 90 are stretched. When the posts 79 move to rear ends of the sliding slots 87 of the mounting members 80, the male connector 95 is received in the female connector 13 of the card reader 10. The securing portion 635 of the securing member 63 becomes aligned with and engages in the fixing hole 12 of the card reader 10. The stopping portion 637 of the securing member 63 prevents the securing portion 635 from being disengaged from the fixing hole 12 of the card reader 10. Thus, the card reader 10 is secured.

In disassembling the card reader 10, the button 653 of the operating member 65 is pressed. The second guiding surface 655 of the operating member 65 slides on the first guiding surface 633 of the securing member 63 to drive the securing portion 635 of the securing member 63 to be retracted and disengaged from the fixing hole 12 of the card reader 10. The card reader 10 together with the bracket 70 slides back toward the front wall 24 of the chassis 20 via both of the first resilient members 90. A front portion of the card reader 10 moves out of the bezel 40. Thus, the card reader 10 can be removed. Due to simultaneous functioning of both of the first resilient members 90, the card reader 10 is able to move smoothly and precisely out of the chassis 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A mounting apparatus for mounting a card reader that defines a fixing hole in a sidewall thereof, and forms a first connector in a rear wall thereof, comprising:
   a chassis comprising a front wall defining a first opening for the card reader passing therethrough;
   a bracket slidably mounted to the chassis, a second connector mounted to the bracket, corresponding to the first connector of the card reader;
   at least a first resilient member connected between the chassis and the bracket, said first resilient member being stretched when mounting the card reader; and
   a locking member comprising a retaining member mounted to the chassis, and a securing member mounted to the retaining member via a second resilient member, the securing member comprising a securing portion protruding therefrom for engaging with the fixing hole of the card reader.

2. The mounting apparatus as claimed in claim 1, wherein the chassis further comprises a bottom wall, the front wall extends from the bottom wall, the bracket slidably mounted to the bottom wall comprises a pair of sideboards, said first resilient member comprises a pair of first resilient members, the first resilient members are connected between the sideboards and the front wall of the chassis.

3. The mounting apparatus as claimed in claim 2, further comprising a pair of mounting members mounted to the bottom wall, wherein each of the mounting members comprises a supporting portion defining a sliding slot therein, a post protrudes from each of the sideboards of the bracket to slide in a corresponding sliding slot.

4. The mounting apparatus as claimed in claim 2, wherein the locking member further comprises an operating member movably mounted to the retaining member, an upper portion of the securing member is located between the retaining member and the operating member, the operating member comprises a slanting first guiding surface, the securing member comprises a slanting second guiding surface formed on the upper portion thereof to slide on the first guiding surface.

5. The mounting apparatus as claimed in claim 4, wherein the retaining member comprises a retaining space for holding the securing member therein.

6. The mounting apparatus as claimed in claim 5, wherein the retaining member further comprises a bottom portion, a front portion extending from a front side of the bottom portion, and a rear portion extending from a rear side of the bottom portion, the bottom portion, the front portion, and the rear portion enclose the retaining space.

7. The mounting apparatus as claimed in claim 6, wherein a containing hole is defined in each of the front portion and the rear portion opposite to each other, the operating member further comprises a button, and a pusher extending back from the operating member, the first guiding surface is formed on the pusher, the pusher is inserted into the containing holes to slide therein.

8. The mounting apparatus as claimed in claim 7, wherein a cross-shaped through hole is defined in the front wall of the chassis for the pusher of the operating member passing therethrough.

9. The mounting apparatus as claimed in claim 8, further comprising a bezel mounted to the front wall, wherein a second opening aligning with the first opening of the chassis and an aperture aligning with the through hole of the chassis are defined in the front bezel, the button of the operating member is received in the aperture, a blocking portion protrudes from each of a top and a bottom of the pusher adjacent the button for being blocked by the bezel.

10. A mounting apparatus for mounting a component defining a fixing hole, comprising:
a chassis comprising a front wall defining a first opening for the component passing therethrough;
a bracket slidably mounted to the chassis;
at least a first resilient member connected between the chassis and the bracket, said first resilient member being stretched when mounting the component; and
a locking member comprising a retaining member mounted to the chassis, and a securing member mounted to the retaining member via a second resilient member, the securing member comprising a securing portion protruding therefrom for engaging in the fixing hole of the component.

11. The mounting apparatus as claimed in claim 10, wherein the chassis further comprises a bottom wall, the front wall extends from the bottom wall, the bracket slidably mounted to the bottom wall comprises a pair of sideboards, said first resilient member comprises a pair of first resilient members, the first resilient members are connected between the sideboards and the front wall of the chassis.

12. The mounting apparatus as claimed in claim 11, further comprising a pair of mounting members mounted to the bottom wall, wherein each of the mounting members comprises a supporting portion defining a sliding slot therein, a post protrudes from each of the sideboards of the bracket to slide in a corresponding sliding slot.

13. The mounting apparatus as claimed in claim 12, wherein the locking member further comprises an operating member movably mounted to the retaining member, an upper portion of the securing member is located between the retaining member and the operating member, the operating member comprises a slanting first guiding surface, the securing member comprises a slanting second guiding surface formed on the upper portion to slide on the first guiding surface.

14. The mounting apparatus as claimed in claim 13, wherein the retaining member further comprises a bottom portion, a front portion extending from a front side of the bottom portion, and a rear portion extending from a rear side of the bottom portion, the bottom portion, the front portion, and the rear portion enclose a retaining space to hold the operating member.

15. The mounting apparatus as claimed in claim 13, wherein a containing hole is defined in each of the front portion and the rear portion opposite to each other, the operating member further comprises a button, and a pusher extending back from the operating member, the first guiding surface is formed on the pusher, the pusher is inserted into the containing holes to slide therein.

16. The mounting apparatus as claimed in claim 15, further comprising a bezel mounted to the front wall, wherein a cross-shaped through hole is defined in the front wall of the chassis for the pusher of the operating member passing therethrough, a second opening aligning with the first opening of the chassis and an aperture aligning with the through hole of the chassis are defined in the front bezel, the operating portion of the operating member is received in the aperture, a blocking portion protrudes from each of a top and a bottom of the pusher adjacent the button for being blocked by the bezel.

17. An electronic device comprising:
a chassis of said electronic device defining an opening along a side thereof to provide access into said chassis through said opening;
a bracket movably installable in said chassis, two resilient members mechanically connectable between two opposite sideboards of said bracket and said side of said chassis so as to allow said bracket to be movable along a direction perpendicular to said side of said chassis; and
a portable electronic component removably installable in said chassis through said opening, said component movable into said chassis along said direction of said bracket so as to drive movement of said bracket together with said component, and said resilient members mechanically connectable with said two opposite sideboards of said bracket respectively being simultaneously triggered to tend to repel said component out of said chassis via engagement between said bracket and said component.

18. The electronic device as claimed in claim 17, wherein said resilient members react simultaneously to said movement of said bracket in the same way.

* * * * *